United States Patent
Cooper et al.

(10) Patent No.: US 8,667,649 B2
(45) Date of Patent: Mar. 11, 2014

(54) SPECIAL BOUTONNIERE DEVICE FOR WEARING FLORAL ARRANGEMENTS

(76) Inventors: James O. Cooper, Fortville, IN (US); Madonna F. Cooper, Fortville, IN (US)

(*) Notice: Subject to any disclaimer, the term of this patent is extended or adjusted under 35 U.S.C. 154(b) by 137 days.

(21) Appl. No.: 12/912,743

(22) Filed: Oct. 27, 2010

(65) Prior Publication Data
US 2011/0094064 A1    Apr. 28, 2011

Related U.S. Application Data

(60) Provisional application No. 61/255,133, filed on Oct. 27, 2009.

(51) Int. Cl.
*A45F 5/08* (2006.01)

(52) U.S. Cl.
USPC ...................................... 24/5; 24/6

(58) Field of Classification Search
None
See application file for complete search history.

(56) References Cited

U.S. PATENT DOCUMENTS

| | | | |
|---|---|---|---|
| 425,082 A * | 4/1890 | Schreyer | 24/6 |
| 1,533,169 A * | 4/1925 | Donohue | 24/6 |
| 1,778,246 A * | 10/1930 | Deans | 24/6 |
| 4,425,679 A | 1/1984 | Rizzuto | |
| D334,905 S | 4/1993 | Ritz | |
| 6,389,649 B1 | 5/2002 | Metzler | |
| D550,121 S | 9/2007 | Minneci | |
| 7,950,111 B2 * | 5/2011 | Katnik | 24/6 |

* cited by examiner

*Primary Examiner* — Jack W. Lavinder
(74) *Attorney, Agent, or Firm* — John D Ritchison; Ritchison Law Offices, PC

(57) ABSTRACT

A Boutonniere mounting device for Wearing Floral Arrangements. The device is comprised of a flexible panel with features, a means to attach the panel to a floral arrangement, and one or more securing means such as pins to complete mounting device and floral arrangement clothing or other supportable means. It provides a manner for the affixing of flowers or other objects to clothing.

6 Claims, 6 Drawing Sheets

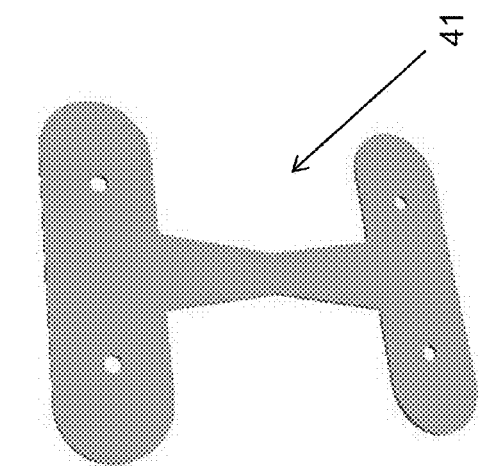
Fig. 1B
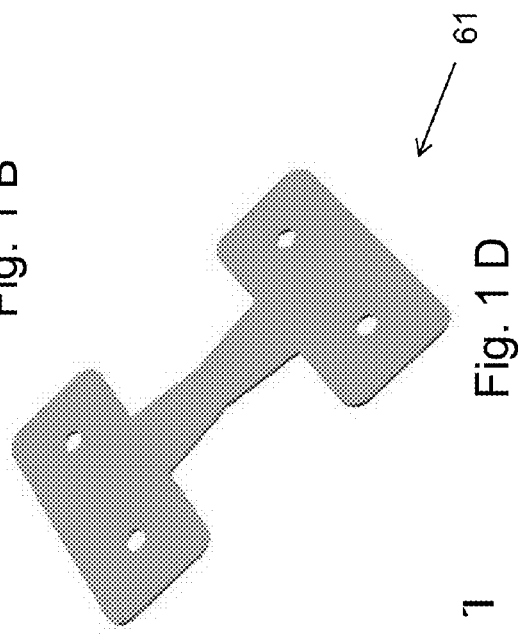
Fig. 1D
Fig. 1
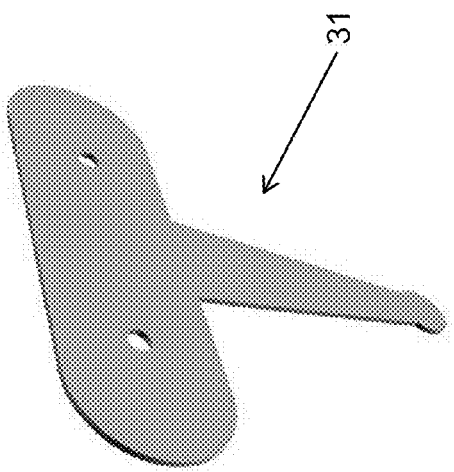
Fig. 1A
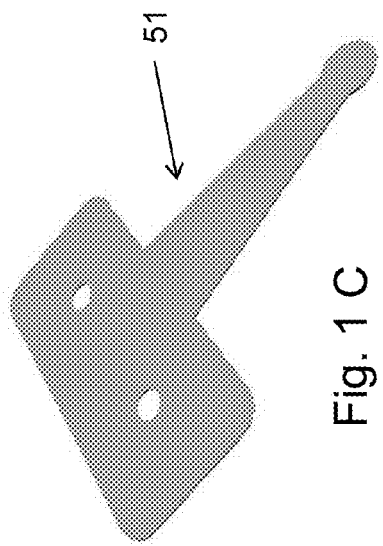
Fig. 1C

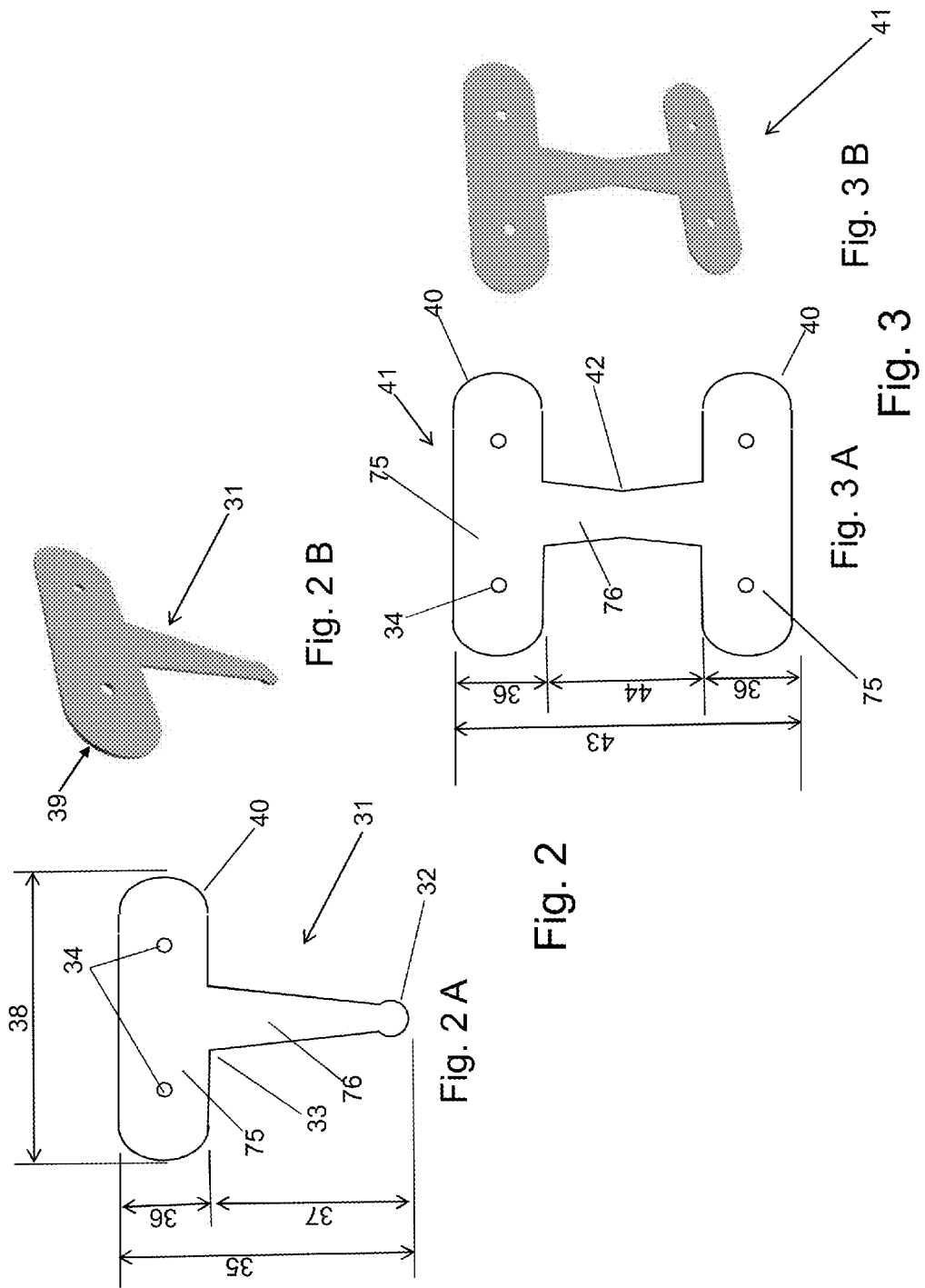

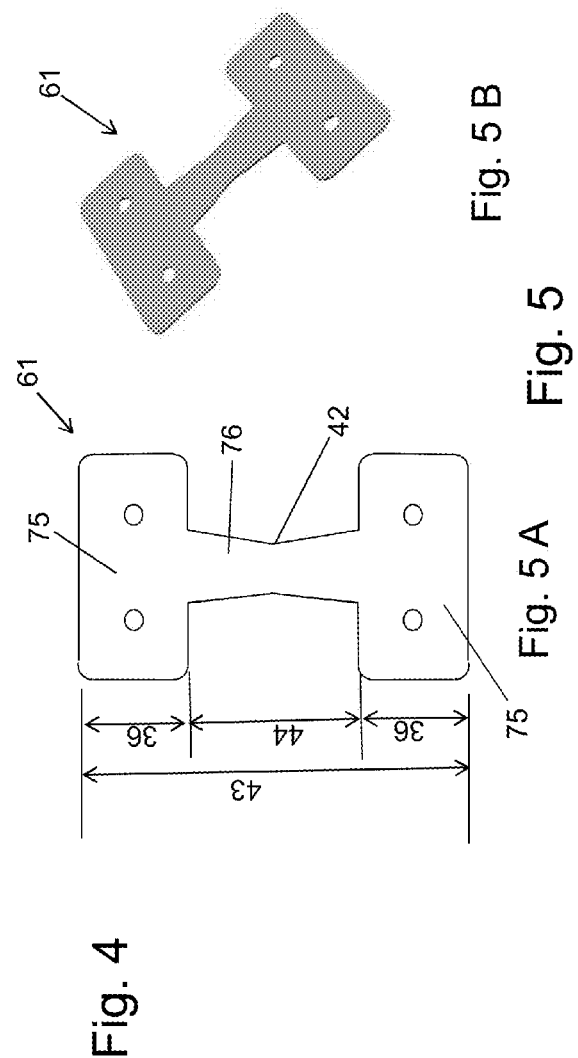
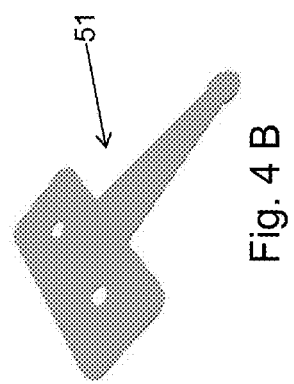
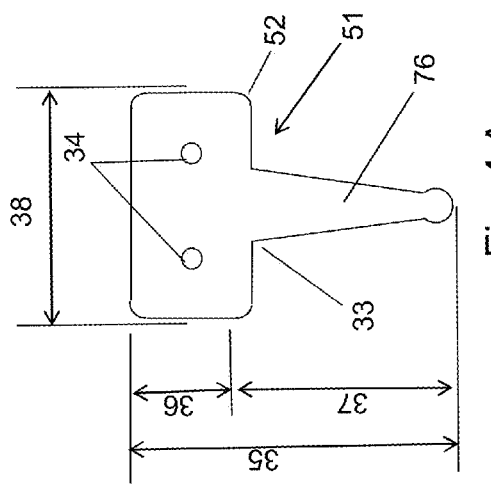

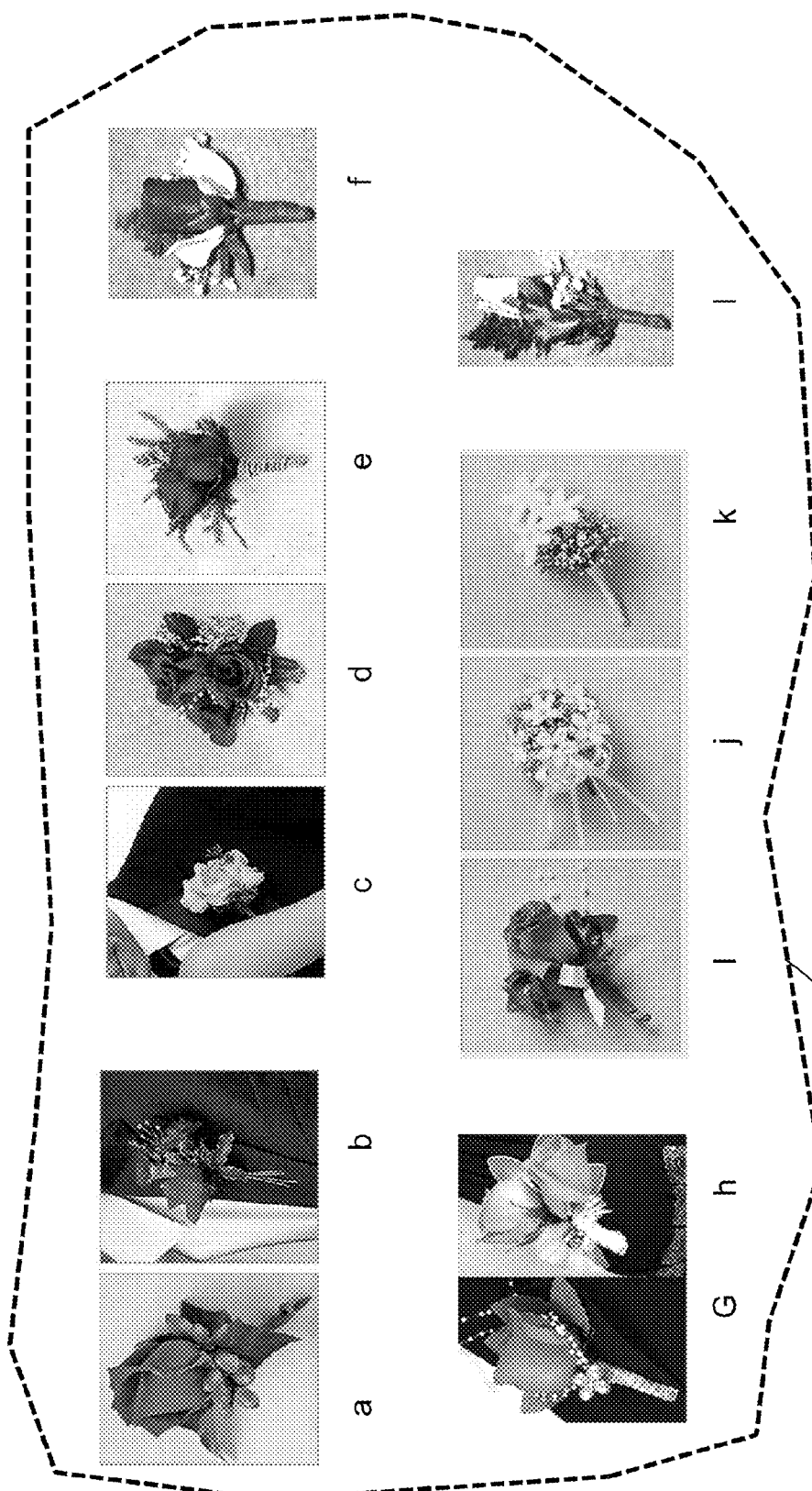

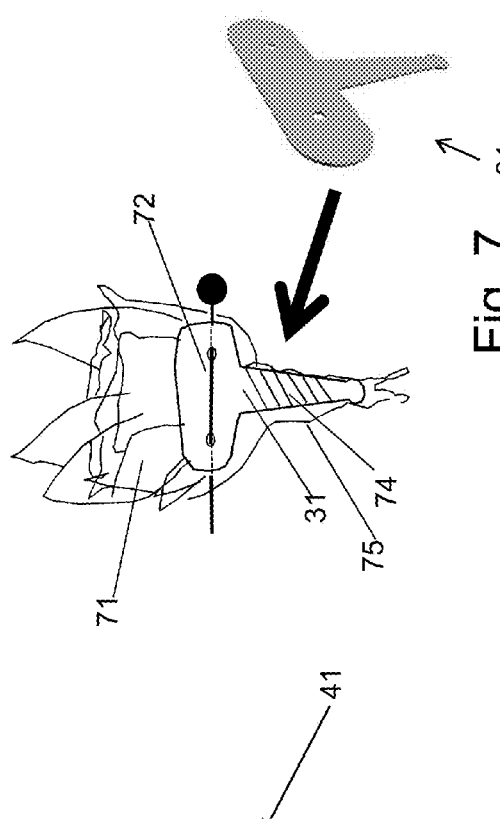
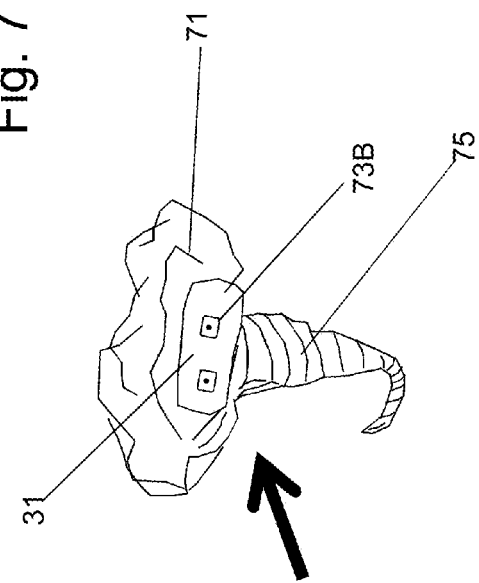
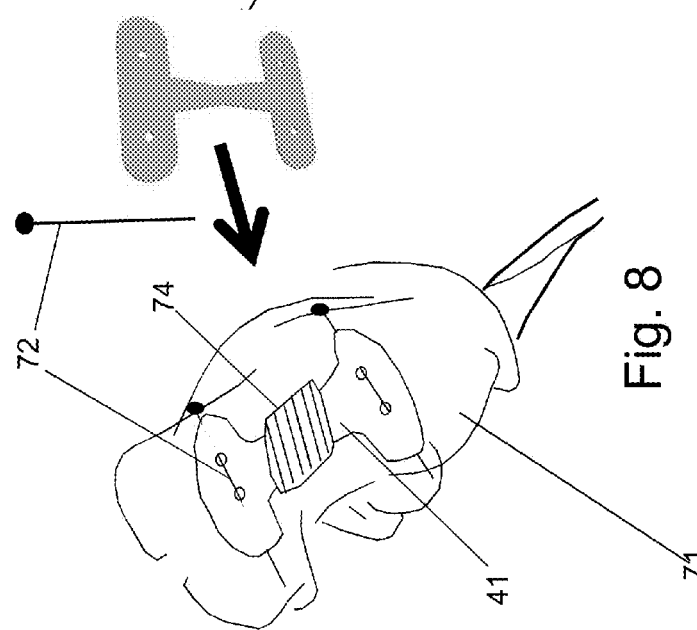
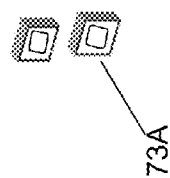
Fig. 7
Fig. 8
Fig. 9

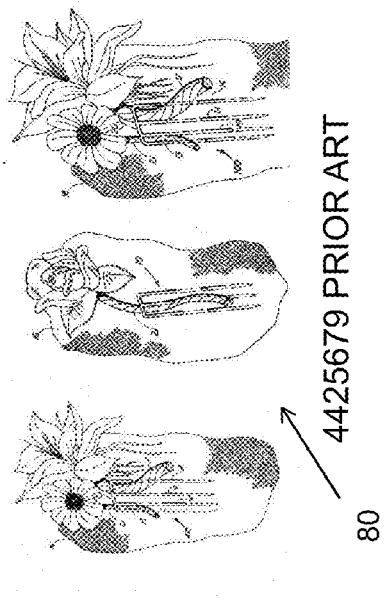
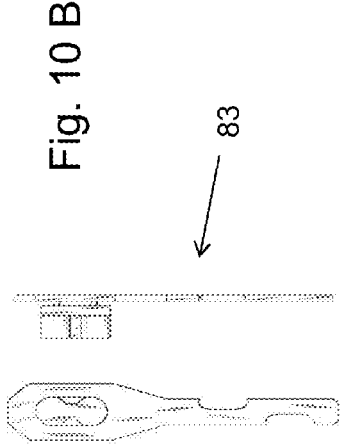
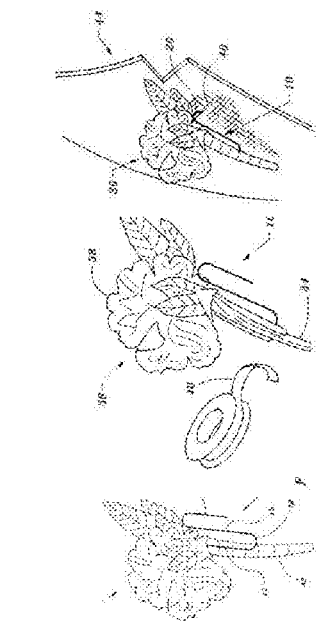
Fig. 10 A 4425679 PRIOR ART
Fig. 10 B D334905 PRIOR ART
Fig. 10 C 6389649 PRIOR ART
Fig. 10 D D550121 PRIOR ART
Fig. 10

SPECIAL BOUTONNIERE DEVICE FOR WEARING FLORAL ARRANGEMENTS

CROSS REFERENCE TO RELATED APPLICATIONS

This application claims the benefit of Provisional Patent Application Ser. No. 61/255,133 filed Oct. 27, 2009 by James O. Cooper et al and entitled "Special Boutonniere device for Wearing Floral Arrangements".

FIELD OF INVENTION

This invention is a Special Boutonniere device for Wearing Floral Arrangements. The device relates generally to cards and attachment pins and more specifically to a flexible card with features for the affixing of flowers or other objects to clothing or other puncture-able supporting means. The invention herein relates to the attachment card and attachment pins that are used to secure flowers or their objects to clothing. The preferred embodiment of the device is comprised of a flexible panel with features, a means to attach the panel to a floral arrangement, and one or more securing means such as pins to complete mounting device and floral arrangement clothing or other supportable means.

FEDERALLY SPONSORED RESEARCH

None.

SEQUENCE LISTING OR PROGRAM

None.

BACKGROUND

Field of Invention and Prior Art

A. Introduction of the Problems Addressed

Ever since flowers have been worn with nice casual and with formal clothing, there have been attempts to provide an easy and functional answer to easily attaching the flowers to the garments. Prior devices and methods included straight pins which are commonly used to secure a boutonniere or corsage to the lapel or collar of the wearer's clothing. Anyone who repeatedly endures the types of devices that feature a "sticking" process will eventually get stuck. This is true of the wearer and the person placing the flower on the clothing. Straight pins are reasonably functional and inexpensive to manufacture. This accounts for their continued popularity, even though a great deal of art exists each making an attempt to provide a better, and more potentially painless, method.

B. Prior Art

In prior art, disclosures have been made, many including large structural elements that are intended to house the base of the flower. These are not only costly to manufacture but bulky, uncomfortable and potentially unflattering to wear. The appearance of the boutonniere or corsage is a fashion accessory. The method of attachment is not. The mounting device should be as small and inconspicuous as possible. FIGS. 10 A through 10 D are examples of prior art for use with mounting floral devices.

FIG. 10 A shows a boutonniere attaching pin 80 from a 1984 Prior Art Utility U.S. Pat. No. 4,425,679 issued to Rizzutto, et al. There is no special support leaf or backing shown. This disclosure relates to an attachment pin or needle which incorporates a plurality of more than two parallel prongs to serve as a device to fasten a boutonniere, floral arrangement or other non-related article to personal clothing, to a floral display, or to any puncturable supporting means, so that the flower or other material remains securely attached, and so that a variety of sizes of boutonniere may be grasped. With the three prongs and the lack of a back sheet, the device will permit sticking. The enabling features of the Cooper device are missing.

FIG. 10 B shows a design device 81 issued in 1993 to Ritz for a Prior Art Design Pat. No. D 334,905. It shows a curved back attachment with mechanical push devices to attach the corsage. It still provides an ornamental scheme that has the pins directed at the person when worn on the outer clothing unlike the shield of the Cooper device that "keeps" the pin separated and essentially perpendicular to the wear's body.

Some devices employ backings of soft or rigid material to support the flowers and still use a form of a straight pin to fasten this to the clothing. To secure the device many include "caps" to enclose the end of the pin. FIG. 10 C shows a complex hook device 82 from a 2002 utility patent U.S. Pat. No. 6,389,649 issued to Metzler. This is a garment accessory-mounting device that provides a safe and easy to use mounting method. Though design variations exist, in the preferred embodiment the device includes a substantially flattened "S" shaped structure. The free ends of the "S", or the two end members, are substantially parallel to one another. A substantially longitudinal base member is positioned between the end members. A pair of joiners connect the base member to each of the end members, one on each end of the base member, thus creating the "S" shape. The distal ends of the end members are end tips that are preferably sharpened to a generally conical shape. This allows the user to spear a flower or other floral arrangement on one of the end members while the other end member is then positioned as a "hook" to easily support the combination on any garment, the weight of the arrangement aiding to hold it in place. A tip cap may be used in some cases to prevent the tip that is on the garment from contacting the user's skin. These types of fastening systems usually reside on the inside of the clothing and are many times bulky, distorting the shape of the clothing and possibly resting against the skin of the user. With some more tight fitting garments, over time this could wear against the user's skin and become as uncomfortable as the proverbial pin stick. The new Cooper device avoids the potential contact with its durable backing.

Still others use a type of button that is a part of the clothing. FIG. 10 D shows the Prior Art Design Patent No. D 550,121 issued to Minneci in 2007. This prevents the process of "pinning" someone, in that in most cases a "pin" is not required to be directly next to the person. If there is a pin, it is likely secured to the button, usually on the exterior of the garment. This reduces the potential for injuring the user, but not the person doing the pinning. Another drawback to such a system is that it can only be used with a garment that has this "button" sewn on to it. Formal occasions that desire a floral accessory are as unique as the attire. Modifying a garment to add such a "button" is in many cases not desirable. All these do not anticipate the present device shown herein.

None of the prior art found shows the simple and functional configuration as the new Special Boutonniere device for Wearing Floral Arrangements 31 et al. As far as known, there is no other mounting device for floral arrangements such as boutonnieres and corsages at the present time which fully provide these improvements and functional characteristics as the present device. It is believed that this device is made with fewer parts with improved configurations and physical features to provide more functionality when compared to other currently utilized devices or methods to provide mounting device for floral arrangements. The particular combinations of materials and features are unique and novel and are not anticipated by prior art. Likewise unique is the use of the special support device for a mounting device for floral arrangements compared to prior art devices.

SUMMARY OF THE INVENTION

A securing card or backing and attachment pins that are used to secure flowers or their objects to clothing. The preferred embodiment of the device is comprised of a flexible panel with features, a means to attach the panel to a floral arrangement, and one or more securing means such as pins to complete mounting device and floral arrangement clothing or other supportable means.

OBJECTS AND ADVANTAGES

There are several objects and advantages of the Special Boutonniere device for Wearing Floral Arrangements 31. There are currently no known floral mounting devices that are effective at providing the objects of this invention.

The invention presented is the Special Boutonniere device for Wearing Floral Arrangements 31. This device relates to a growing need for better floral mountings of boutonnieres, corsages and the like. This need is derived from a growing population that is getting younger, going to more high school, college and other types of formal occasions, and is continuing to look for fast, simple means to quickly prepare for a formal occasions than generations past. Particularly this new Special Boutonniere device for Wearing Floral Arrangements 31 is related to devices and methods to add simplicity, safety and speed concerns from a less functional means of pinning boutonnieres and corsages to garments.

The following TABLE A summarizes various advantages and objects of the Special Boutonniere device for Wearing Floral Arrangements 31. This list is exemplary and not limiting to the many advantages offered by this new device.

TABLE A

Various Benefits, Advantages and Objects
This device:

| ITEM | BENEFIT |
|---|---|
| 1. | Increases the ease of attaching floral arrangements such as boutonnieres and corsages to garments. |
| 2. | Eliminates safety hazard of sticking a person as he/she mounts the arrangement to the garment. |
| 3. | Provides floral shops an easy means to attach the floral arrangement to a mounting means. |
| 4. | Provides an advertisement means (clip leaf surface of the device) to the floral company. |
| 5. | Is relatively inexpensive as compared to other floral attachment devices. |
| 6. | Is easy to manufacture. |
| 7. | Is easy to package and light to transport. |
| 8. | May be sold retail and wholesale and on the internet. |

Noteworthy is that other advantages and additional features of the Special Boutonniere device for Wearing Floral Arrangements 31 will be more apparent from the accompanying drawings and from the full description of the device. For one skilled in the art of Boutonniere and corsage mounting, it is readily understood that the features shown in the examples with this device is readily adapted for improvement to other types of mechanisms and devices for use with the mounting and affixing of boutonnieres and corsages in general and the mounting methods of the floral industry with such devices in particular.

DESCRIPTION OF THE DRAWINGS

Figures

The accompanying drawings, which are incorporated in and constitute a part of this specification, illustrate a preferred and alternative embodiments for the Special Boutonniere device for Wearing Floral Arrangements 31. The drawings together with the summary description given above and a detailed description given below serve to explain the principles of the special floral mounting device. It is understood, however, that the device is not limited to only the precise arrangements and instrumentalities shown.

FIGS. 1 A through 1 D are isometric sketches and views of the preferred and alternative embodiments of the Special Boutonniere device for Wearing Floral Arrangements 31.

FIGS. 2 A and 2 B show the preferred embodiment of the curved single leaf Boutonniere device 31 for Wearing Floral Arrangements 31 with the specific features.

FIGS. 3 A and 3 B show the alternative embodiment of the curved double end leaf Boutonniere device 41 for Wearing Floral Arrangements with the specific features.

FIGS. 4 A and 4 B show the alternative embodiment of the boxed single end leaf Boutonniere device 51 for Wearing Floral Arrangements with the specific features.

FIGS. 5 A and 5 B show the alternative embodiment of the boxed double end leaf Boutonniere device 61 for Wearing Floral Arrangements with the specific features.

FIG. 6 shows various boutonnieres and corsages such as the ones used with the new preferred and alternative special Boutonniere device for Wearing Floral Arrangements 31, 41, 51, 61.

FIG. 7 shows mounting a curved single end leaf Boutonniere device 31 to a floral arrangement such as a boutonniere or corsage.

FIG. 8 shows mounting a curved double end leaf Boutonniere device 41 to a floral arrangement such as a boutonniere or corsage.

FIG. 9 shows mounting a curved single end leaf Boutonniere device 31 to a floral arrangement with a push pin means of attachment.

FIGS. 10 A through 10 D are examples of prior art for use with mounting floral devices.

DESCRIPTION OF THE DRAWINGS

Reference Numerals

The following list refers to the drawings:

TABLE B

Reference numbers

| Ref # | Description |
|---|---|
| 31 | Preferred embodiment of curved single leaf Boutonniere device |
| 32 | Curved end bulb to facilitate and assist connection means to flower |
| 33 | Transition point clip leaf to means (clip leg) to connect flower |
| 34 | Fastening means aperture for fastener (pin) 72 to connect to garment and clip leaf |
| 35 | Overall length of device |
| 36 | Length of clip leaf 75 |

TABLE B-continued

Reference numbers

| Ref # | Description |
|---|---|
| 37 | Length of connection leg 76 |
| 38 | Width of clip leaf 75 |
| 39 | Thickness of device |
| 40 | Curved end |
| 41 | Alternative embodiment of curved double end leaf Boutonniere device |
| 42 | Necking point of extended double end device |
| 43 | Overall length of device of double end device |
| 44 | Length of extension piece for the connection leg 76 |
| 51 | Alternative embodiment of boxed single end leaf Boutonniere device |
| 52 | boxed end configuration |
| 61 | Alternative embodiment of boxed double end leaf Boutonniere device |
| 70 a-1 | Various flower corsages and Boutonnieres |
| 71 | Flower |
| 72 | Means(straight pin or equivalent) to connect flower to lapel or dress/gown |
| 73A | Push-pin stick means |
| 73B | Push-pin receiver means |
| 74 | Means to connect device to flower (string, wire wrap, adhesive or equivalent) |
| 75 | Clip leaf |
| 76 | Means to connect device - Connection leg - to flower |
| 80 | Prior Art Patent No. 4425679 |
| 81 | Prior Art Patent No. D334905 |
| 82 | Prior Art Patent No. 6389649 |
| 83 | Prior Art Patent No. D550121 |

DETAILED DESCRIPTION OF PREFERRED EMBODIMENT

The present invention presented is the Special Boutonniere device for Wearing Floral Arrangements 31. This device relates to a growing need for better means to attach boutonnieres and corsages to garments. Specifically, the device relates generally to cards and attachment pins and more specifically to a flexible card with features for the affixing of flowers or other objects to clothing or other puncture-able supporting means. The invention herein relates to the attachment card and attachment pins that are used to secure flowers or their objects to clothing. The preferred embodiment of curved single leaf Boutonniere device 31 is comprised of a flexible panel with features, a means to attach the panel to a floral arrangement, and one or more securing means such as pins to complete mounting device and floral arrangement clothing or other supportable means.

There is shown in FIGS. 1-10 a complete detail and operative embodiment of the Special Boutonniere device for Wearing Floral Arrangements 31. In the drawings and illustrations, one notes well that the FIGS. 1, 2, 3, 4 and 5 show detail of the special configuration. FIGS. 7, 8, and 9 help describe its use and operation. FIG. 6 shows floral boutonnieres and corsages and the like. FIG. 10 show some prior art in the floral attachment industry.

The advantages for the Special Boutonniere device for Wearing Floral Arrangements 31 are listed above in the introduction. Succinctly the benefits for the device are:

Increases the ease of attaching floral arrangements such as boutonnieres and corsages to garments.
Eliminates safety hazard of sticking a person as he/she mounts the arrangement to the garment.
Provides floral shops an easy means to attach the floral arrangement to a mounting means.
Provides an advertisement means (clip leaf surface of the device) to the floral company.
Is relatively inexpensive as compared to other floral attachment devices
Is easy to manufacture.
Is easy to package and light to transport.
May be sold retail and wholesale and on the internet.

The preferred embodiment of a special floral attachment device 31 is comprised of (a) a flexible clip leaf with features 75; (b) a connector leg 76 with features; (c) a means to secure 74 the device 31 to a flower 71; and (d) a means 72 to connect the device 31 to a garment wherein the special device 31 may be used to safely and easily provide a mounting means of the flower as a floral arrangement to a garment.

The accompanying drawings, which are incorporated in and constitute a part of this specification, illustrate a preferred embodiment of the special support device 31 for attaching floral arrangements. The drawings together with the summary description given above and a detailed description given below serve to explain the principles of the special attachment device 31. It is understood, however, that the device 31 is not limited to only the precise arrangements and instrumentalities shown.

FIGS. 1A through 1D are isometric sketches and views of the preferred and alternative embodiments of the Special Boutonniere device for Wearing Floral Arrangements. The preferred embodiment of the curved single leaf Boutonniere device 31 is shown in FIG. 1A. The alternative embodiment of curved double end leaf Boutonniere device 41 is shown in FIG. 1 B. The alternative embodiment of boxed single end leaf Boutonniere device 51 is shown in FIG. 1C. And, the alternative embodiment of boxed double end leaf Boutonniere device 61 is shown in FIG. 1D. Further features and descriptions are presented below.

FIGS. 2 A and 2 B show the preferred embodiment of the curved single leaf floral attachment/Boutonniere device 31 for Wearing Floral Arrangements 31 with the specific features. FIG. 2 A, the device 31 has a curved end "bulb" 32 to facilitate and assist a means 74 to attach the leg 76 of the device 31 to the flower 71 (by a means 74 as described in the operation below). The clip leaf 75 where the device is attached to the garment (not shown) through the fastening means apertures 34 and it has a curved configuration 40 at each of the two ends. The clip leaf 75 transitions at the transition point 33 into the connection leg 76 structure to connect to the flower 71 (flower not shown) where the flower 71 is attached to the leg 76. The overall length 35 of the device 31, the width 38, and the length 36 of the clip leaf 75 and the length 37 of leg 76 are shown. These are exemplary and not limiting to artfully show a workable configuration of the clip leaf 75 and connector leg 76 of the device 31. Note in the isometric FIG. 2 B, the "thin" thickness 39 is shown.

FIGS. 3 A and 3 B show the alternative embodiment of the curved double end leaf Boutonniere device 41 for Wearing Floral Arrangements with the specific features. In FIG. 3 A, The device 41 has no curved end "bulb" but rather a necking point 42 of the connector leg 76 to facilitate and assist a means 74 to attach the leg 76 of the device 41 to the flower 71 by a means 74 as described in the operation below. The clip leaf 75 is similar to the device 31 except there are two leafs 75 to permit additional fastening means for floral arrangements that have more bulk or weight and require additional fastening of the floral arrangement to the garment. The thickness is similar to described for device 31. FIG. 3 B is an isometric of the alternative device 41.

FIGS. 4 A and 4 B show the alternative embodiment of the boxed single end leaf Boutonniere device 51 for Wearing Floral Arrangements with the specific features. The description is the same as for the preferred curved single device 31 except the curved end 40 has been replaced by a boxed end configuration 52. Likewise, FIGS. 5 A and 5 B show the alternative embodiment of the boxed double end leaf Boutonniere device 61 for Wearing Floral Arrangements with the specific features. This is the same as the curved double end leaf Boutonniere device 41 for Wearing Floral Arrangements with the specific features except the curved end 40 has been replaced by a boxed end configuration 52.

The materials anticipated for the devices 31, 41, 51, and 61 may be of various flexible yet durable compositions. Material thicknesses, for example and not limitation, may range approximately at 4 mil to 15 mil for polyester, poly carbonate, estralon, co-polyesters and the like. It may be a heavy paper composite such as 24 point card stock or 60 pound cover stock. Further, it could be of a mylar like or composite material. A durable, thin sheet plastic such as poly propylene, acrylic, poly urethane, urethane, and the like will also serve well. Some cases may also permit a thin metal or metal and plastic combination. Suffice to say the spirit of the invention is that the thin and flexible clip leaf 75 and connector leg 76 might be adaptable to various materials.

FIG. 6 shows various boutonnieres and corsages such as the ones used with the new preferred and alternative special Boutonniere device for Wearing Floral Arrangements 31, 41, 51, 61. The various types are self explanatory and are individually labeled as 70 "a" to 70"l".

FIGS. 7, 8 and 9 show the way the device 31 is used with the flowers 71. These are discussed below.

FIGS. 10 A through 10 D are examples of prior art for use with mounting floral devices. These are briefly compared to the Cooper device above in the Prior Art section. FIG. 10 A shows a boutonniere attaching pin 80 from a 1984 Prior Art Utility U.S. Pat. No. 4,425,679 issued to Rizzutto, et al. No special support leaf is shown. FIG. 10 B shows a design device 81 issued in 1993 to Ritz for a Prior Art Design Pat. No. D 334,905. FIG. 10 C shows a complex hook device 82 from 2002 Prior Art Utility U.S. Pat. No. 6,389,649 issued to Metzler. Finally, FIG. 10 D shows the Prior Art Design Patent No. D 550,121 issued to Minneci in 2007. None show the simple and functional configuration as the new Special Boutonniere device for Wearing Floral Arrangements 31 et al.

All of the details mentioned here are exemplary and not limiting. Other components specific to describing the new Special Boutonniere device for Wearing Floral Arrangements 31 may be added as a person having ordinary skill in the field of boutonnieres and corsage attachment means and related devices in the floral industry well appreciates.

Operation of the Preferred Embodiment

The preferred embodiment of the new Special Boutonniere device for Wearing Floral Arrangements 31 has been described in detail above. The manner of how the device operates is described below. A person having ordinary skill in the field of boutonnieres and corsage attachment means and related devices in the floral industry will note that the description above and the operation described here must be taken together to fully illustrate the concept of the special support device 31. FIG. 7, FIG. 8, and FIG. 9 are examples of how to use the new Special Boutonniere device for Wearing Floral Arrangements 31.

FIG. 7 shows the mounting of a curved single end leaf Boutonniere device 31 to a floral arrangement 71 such as a boutonniere or corsage. The device 31 is held by a fastening means 74 such as a string, wire, or adhesive. The device 31 is then attached to a garment (not shown but noted) by a means 72 such as a straight pin, safety pin, bobby pin or the like.

FIG. 8 shows the mounting of a curved double end leaf Boutonniere device 41 to a floral arrangement 71 such as a boutonniere or corsage. The fastening is accomplished as described for a single end device 31 except there are now two clip leafs on the device 41. This permits additional fastening for bulky or heavy floral arrangements.

FIG. 9 shows mounting a curved single end leaf Boutonniere device 31 to a floral arrangement with a push pin means of attachment 73A and 73B. The wrap means 74 to connect the connector leg 76 to the flower 71 is shown and has been described above.

With the above description it is to be understood that the new Special Boutonniere device for Wearing Floral Arrangements 31 is not to be limited to only the disclosed embodiment. The features of the special attachment devices 31, 41, 51, and 61 are intended to cover various modifications and equivalent arrangements included within the spirit and scope of the description.

What is claimed is:

1. A single leaf floral attachment device (31) comprised of
   (a) a single clip leaf (75) made of a flat and flexible sheet material, the single clip leaf (75) having a configuration (40) at each of two ends and an attached, contiguous leg (76) at a transition point (33), the contiguous leg (76) made from the same sheet material as the single clip leaf (75);
   (b) a means (74) for structurally securing the leg (76) to a flower (71);
   (c) the contiguous leg (76) further having a curved end bulb (32) which facilitates and assists the means (74) for structurally securing the leg being connected to the device (31);
   (d) a pair of fastening means apertures (34) through the single clip leaf (75); and
   (e) a means (72) for connecting the single clip leaf (75) through the apertures (34) to a garment
   wherein the single leaf floral attachment device (31) may be used to safely and easily provide a mounting means of the flower (71) as a floral arrangement to a garment.

2. The single leaf floral attachment device according to claim 1 wherein the configurations (40) of the single clip leaf has a set of curved ends.

3. The single leaf floral attachment device according to claim 1 wherein the configurations (40) of the single clip leaf has a set of boxed ends.

4. The device according to claim 1 wherein the flexible sheet material is from the group consisting of a cardboard, a polyester, a poly carbonate, a composite material, a mylar, and an acrylic material.

5. A double leaf floral attachment device (41) comprised of
   (a) a pair of single clip leaves (75) made of a flat and flexible sheet material, each of the clip leaves (75) having a configuration (40) at each of the ends and the pair having connected to each other by an attached, contiguous leg (76) at transition points (33), the contiguous leg (76) made from the same sheet material as the pair of single clip leaves (75);
   (b) a means (74) for structurally securing the leg (76) to a flower (71);
   (c) the leg (76) further having a necking point (42) configured midway between the pair of single clip leaves (75), the necking point which facilitates and assists the means (74) for structurally securing the leg being connected to the device (31);
   (d) a pair of fastening means apertures (34) through each pair of the single clip leaves (75); and (e) a means (72) to connect each end of the clip leaves (41) through the apertures (34) to a garment wherein the double leaf floral attachment device (41) may be used to safely and easily provide a mounting means of the flower (71) as a floral arrangement to a garment.

6. A single leaf floral attachment device (31) comprised of (a) a pair of single clip leaves (75) made of a flat and flexible sheet material, the clip leaves (75) each having a configuration (40) at each of the ends and connected to an attached, contiguous leg (76) at transition points (33), the contiguous leg (76) made from the same sheet material as the single clip leaf (75);

(b) a fiber cord wrap (74) for structurally securing the leg (76) to a flower (71);

(c) the leg (76) further having a curved end bulb (32) which facilitates and assists the means (74) for structurally securing the leg being connected to the device (31);

(d) a pair of fastening means apertures (34) through of the single clip leaf (75); and (e) a means (72) to connect the clip leaf (31) through the apertures (34) to a garment wherein the curved single leaf floral device (31) may be used to safely and easily provide a mounting means of the flower (71) as a floral arrangement to a garment.

* * * * *